(No Model.)
H. J. PHELPS.
MODE OF MAKING METALLIC WHEELS.
No. 433,183. Patented July 29, 1890.
Fig. 1.
1
Fig. 2.
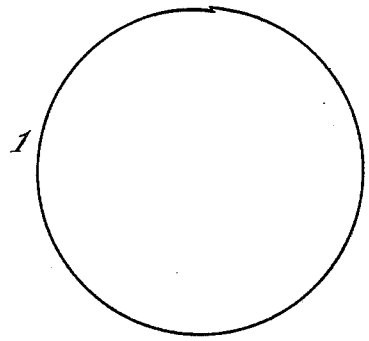
Fig. 3.
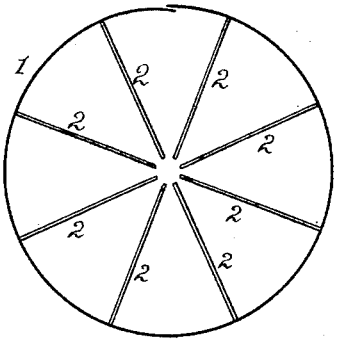
Fig. 4.
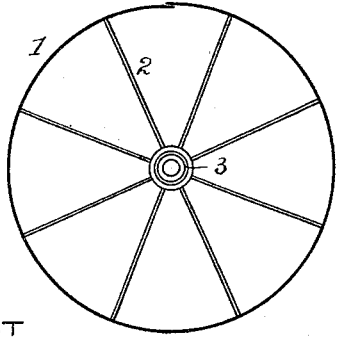
Fig. 5.
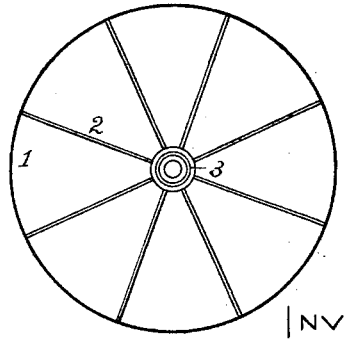
ATTEST
Helen Graham
W. W. Graham
INVENTOR
H. J. PHELPS,
By L. P. Graham
his attorney.

UNITED STATES PATENT OFFICE.

HARVEY J. PHELPS, OF HAVANA, ILLINOIS, ASSIGNOR TO JOHN W. RHODES, OF SAME PLACE.

MODE OF MAKING METALLIC WHEELS.

SPECIFICATION forming part of Letters Patent No. 433,183, dated July 29, 1890.

Application filed April 22, 1890. Serial No. 349,021. (No model.)

*To all whom it may concern:*

Be it known that I, HARVEY J. PHELPS, of Havana, in the county of Mason and State of Illinois, have invented certain new and useful Improvements in the Process of Making Wheels, of which the following is a specification.

This invention relates to the process of making metal wheels in which the tire and spokes consist of wrought-iron or steel and the hub of cast-iron, the iron being cast around the inner ends of the spokes by the usual method of melting the iron and pouring it into a mold into which the spokes project. Heretofore it has been customary in constructing such wheels to first round up and weld the tire or rim, then insert the spokes into the rim, and finally cast the hub onto the inner ends of the spokes, and, except in the case of very small hubs, the shrinkage of the hub has tended to either draw the rim out of shape or draw some of the spokes out of the tire. This difficulty is in some cases partly overcome by heating the rim previous to casting the hubs, and letting the rim and hub cool and shrink together. This method involves so much extra expense as to render its profitable adoption ordinarily impracticable, and, owing to the difficulty of so heating the rim that its shrinkage shall conform precisely to the shrinkage of the hub, is only a partial success.

My improved method consists in rounding the tire or rim, then inserting the spokes into the rim, then molding the hub, and finally welding the tire.

In the drawings herewith accompanying, Figure 1 represents the tire 1 previous to rounding. Fig. 2 shows the tire rounded. Fig. 3 shows the spokes 2 in position in the rounded tire. Fig. 4 shows the hub 3 cast on the spokes, and Fig. 5 shows the wheel completed by welding the tire.

I am aware that wheels have been made by putting the spokes into the hub and afterward putting on the rim and welding it, and that there are other ways of making wheels in which the welding of the tire is the last step in the process; but I believe myself to be the inventor of the particular method claimed, which lessens the cost of manufacture and permits the construction of true and symmetrical wheels with either large or small hubs.

I claim—

The process of making wheels with wrought-metal rims and cast-metal hubs, which consists in rounding up the rim, inserting the spokes into the rim, molding the hub onto the spokes, and finally welding the ends of the rim together, as set forth.

In testimony whereof I sign my name in the presence of two subscribing witnesses.

HARVEY J. PHELPS.

Attest:
 ISAAC N. MITCHELL,
 FRANK I. MITCHELL.